US010856025B2

(12) United States Patent
Ambrozic et al.

(10) Patent No.: US 10,856,025 B2
(45) Date of Patent: Dec. 1, 2020

(54) SYSTEMS AND METHODS FOR MANAGING USER SUBSCRIPTIONS TO CONTENT SOURCES

(71) Applicant: Rovi Guides, Inc., San Jose, CA (US)

(72) Inventors: Christopher P. Ambrozic, Chapel Hill, NC (US); Michael Hoffman, Durham, NC (US); William E. Purser, Apex, NC (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/130,771

(22) Filed: Sep. 13, 2018

(65) Prior Publication Data

US 2019/0082205 A1    Mar. 14, 2019

Related U.S. Application Data

(60) Provisional application No. 62/558,847, filed on Sep. 14, 2017.

(51) Int. Cl.
| | | |
|---|---|---|
| H04N 7/16 | (2011.01) | |
| H04N 21/25 | (2011.01) | |
| H04N 21/254 | (2011.01) | |
| H04N 21/45 | (2011.01) | |
| H04N 21/482 | (2011.01) | |
| H04N 21/2543 | (2011.01) | |

(52) U.S. Cl.
CPC ......... *H04N 21/251* (2013.01); *H04N 21/254* (2013.01); *H04N 21/2543* (2013.01); *H04N 21/4532* (2013.01); *H04N 21/4826* (2013.01)

(58) Field of Classification Search
CPC ......... H04N 21/44222; H04N 21/4394; H04N 21/812; H04N 21/44008; H04N 21/8352
See application file for complete search history.

(56) References Cited

U.S. PATENT DOCUMENTS

| | | | | |
|---|---|---|---|---|
| 5,758,257 A | * | 5/1998 | Herz | G06Q 20/383 |
| | | | | 348/E7.056 |
| 5,945,988 A | * | 8/1999 | Williams | G11B 27/105 |
| | | | | 348/E17.005 |
| 6,239,794 B1 | | 5/2001 | Yuen | |
| 6,564,378 B1 | | 5/2003 | Satterfield | |
| 6,782,550 B1 | | 8/2004 | Cao | |
| 7,165,098 B1 | | 1/2007 | Boyer | |
| 7,596,797 B1 | | 9/2009 | Kapner | |

(Continued)

FOREIGN PATENT DOCUMENTS

| | | |
|---|---|---|
| EP | 1860877 | 11/2007 |
| WO | WO1999018721 | 4/1999 |

(Continued)

OTHER PUBLICATIONS

U.S. Appl. No. 16/647,299, filed Mar. 13, 2020, Christopher P. Ambrozic.

(Continued)

*Primary Examiner* — Annan Q Shang
(74) *Attorney, Agent, or Firm* — Haley Guiliano LLP

(57) ABSTRACT

Systems and methods are described for a media guidance application (e.g., implemented on a user device) that manages user subscriptions to content sources by modifying content source bundles to tailor them towards user preferences.

18 Claims, 11 Drawing Sheets

(56) References Cited

U.S. PATENT DOCUMENTS

| | | | |
|---|---|---|---|
| 7,761,892 B2 | 7/2010 | Ellis | |
| 8,046,801 B2 | 10/2011 | Ellis | |
| 9,809,798 B2* | 11/2017 | Raghunath | C12N 5/069 |
| 10,003,849 B1* | 6/2018 | Killick | H04N 21/47217 |
| 2002/0174430 A1 | 11/2002 | Ellis | |
| 2005/0028206 A1 | 2/2005 | Cameron et al. | |
| 2005/0251827 A1 | 11/2005 | Ellis | |
| 2006/0282856 A1* | 12/2006 | Errico | G06Q 30/02 |
| | | | 725/46 |
| 2009/0133070 A1* | 5/2009 | Hamano | G06F 21/6218 |
| | | | 725/46 |
| 2010/0153885 A1 | 6/2010 | Yates | |
| 2010/0162324 A1* | 6/2010 | Mehta | H04N 21/4788 |
| | | | 725/61 |
| 2010/0199299 A1* | 8/2010 | Chang | H04N 7/17318 |
| | | | 725/32 |
| 2010/0333037 A1* | 12/2010 | Pavlovski | G06F 3/0481 |
| | | | 715/848 |
| 2010/0333137 A1* | 12/2010 | Hamano | H04N 21/4753 |
| | | | 725/39 |
| 2011/0107374 A1* | 5/2011 | Roberts | H04N 21/251 |
| | | | 725/46 |
| 2011/0321072 A1 | 12/2011 | Patterson | |
| 2012/0079518 A1* | 3/2012 | Wan | H04N 21/44204 |
| | | | 725/14 |
| 2014/0007146 A1* | 1/2014 | Peterson | H04N 21/2543 |
| | | | 725/5 |
| 2014/0229990 A1* | 8/2014 | Lee | H04N 21/4668 |
| | | | 725/46 |
| 2014/0282772 A1* | 9/2014 | Chen | H04N 21/42201 |
| | | | 725/97 |
| 2014/0344289 A1* | 11/2014 | Berenson | G06F 1/3293 |
| | | | 707/751 |
| 2015/0237389 A1* | 8/2015 | Grouf | H04N 21/26241 |
| | | | 725/49 |
| 2015/0319494 A1* | 11/2015 | Dhanabalan | H04N 21/47214 |
| | | | 386/293 |
| 2016/0014461 A1* | 1/2016 | Leech | H04N 21/4312 |
| | | | 725/14 |
| 2016/0142783 A1* | 5/2016 | Bagga | H04N 21/4821 |
| | | | 725/47 |
| 2018/0172696 A1 | 6/2018 | Boniface et al. | |
| 2018/0336645 A1* | 11/2018 | Price | G06Q 30/0631 |

FOREIGN PATENT DOCUMENTS

| | | |
|---|---|---|
| WO | WO2015029079 | 3/2015 |
| WO | WO2015114652 | 8/2015 |

OTHER PUBLICATIONS

PCT International Search Report for International Application No. PCT/US2017/059478, dated Jan. 10, 2018 (16 pages).

* cited by examiner

600

602
Store a First Content Source Bundle Including a First Subset of a Plurality of Content Sources, and a Second Content Source Bundle Including a Second Subset of the Plurality of Content Sources

604
Determine that a User Has a Subscription to the First Content Source Bundle

606
Monitor Viewing Habits of the User Relative to the First Subset of Content Sources in the First Content Source Bundle

608
Modify the First Content Source Bundle to Add a First Content Source from the Second Subset of the Content Sources in the Second Content Source Bundle Based on the Viewing Habits of the User

802
Retrieve from a User Profile, a Subscription Metadata

804
Determine that a User Has a Subscription to the First Content Source Bundle

1202
Characterize the User Based on the Viewing Habits

1204
Identify a Second User Based on the Characterization of the User

1206
Enable the Second User to Subscribe to the Modified First Content Source Bundle in Response to Identifying the Second User Based on the Characterization

1302
Retrieve the User Profile

1304
Analyze the User's Viewing History for Trends and Preferences

1306
Identify a Viewing Schedule of the User Associated with a First Content Source of the Content Sources in the First Content Source Bundle

FIG. 13

SYSTEMS AND METHODS FOR MANAGING USER SUBSCRIPTIONS TO CONTENT SOURCES

CROSS-REFERENCE TO RELATED APPLICATION

This is a non-provisional application of U.S. Provisional Application No. 62/558,847, filed Sep. 14, 2017, which is hereby incorporated by reference herein in its entirety.

BACKGROUND

Content providers of all types (MSO's, MVPD's, Networks, vMVPD's, OTT's, CE) all provide some form of a packaged offering or content source bundles to their subscribers. Those packages often take the form of a variety of themes (basic content, drama package, sports package, kids package, etc.). Content providers allow users to subscribe to a given bundle to access a given set of content sources that are included in the selected content source bundle. This reduces the cost of accessing content sources because the user is not given access to all the content sources, but rather those content sources available in the selected one of the content source bundles. However, the content source bundles are often not well aligned with viewer desires, which results in viewers having to make concession decisions to balance their budget with their desired content coverage, and the viewers are often left unsatisfied. The net effect on content providers is that the audience is non-optimized in terms of content (or channel) coverage, nor in terms of revenue extracted from the audience.

SUMMARY

Accordingly, systems and methods are provided for managing user subscriptions to content sources. The media guidance application modifies content source bundles in order to tailor them towards user preferences. By aligning content source bundles with viewer desires, the media guidance application optimizes content coverage for audiences and revenue generation for content providers.

The media guidance application may store a plurality of content source bundles wherein a first content source bundle includes a first subset of a plurality of content sources and a second content bundle includes a second subset of the plurality of content sources. The media guidance application may determine that a user has a subscription to the first content source bundle, wherein the subscription enables the user to access the first subset of content sources in the first content source bundle. The media guidance application may monitor viewing habits of the user relative to the first subset of content sources in the first content source bundle. The media guidance application may modify the first content source bundle to add a first content source from the second subset of the content sources in the second content source bundle based on the viewing habits of the user.

In some aspects, the media guidance application may store a plurality of content source bundles wherein a first content source bundle includes a first subset of a plurality of content sources and a second content source bundle includes a second subset of the plurality of content sources. For example, the plurality of content source bundles may be various packages that a content provider may offer to users (e.g., economy package, sports package, comedy package, etc.). The plurality of content sources may be all the channels that a content provider offers (e.g., HBO, FOX, ABC, CNN, etc.). Therefore, a subset of the plurality of content sources may be a selection of the plurality of content sources that is a part of the content source bundle. For example, FOX, ABC, and CNN may be a subset of the plurality of content sources (e.g., HBO, FOX, ABC, CNN, etc.) and may be included in a content bundle (e.g., economy package).

The media guidance application may determine that a user has a subscription to the first content bundle, wherein the subscription enables the user to access the first subset of content sources in the first content source bundle. For example, the user may have a subscription to the first content source bundle, the economy package. Suppose that the economy package includes the channels ESPN, ABC, and Disney Channel. By having a subscription to the economy package, the user can therefore access ESPN, ABC, and Disney Channel.

The media guidance application may monitor the viewing habits of the user relative to the first subset of content sources in the first content source bundle. For example, the media guidance application may track the viewing history of the user relative to the first content bundle. In some embodiments, monitoring the viewing habits comprises determining from which content sources in the first content source bundle the user accesses content frequently. For example, the media guidance application may determine how often the user accesses the content sources and the time spent on each. Suppose a user has a subscription to the economy package, which consists of ESPN, ABC, and Disney Channel. The media guidance application may have monitored that the user views content on ESPN between 4:00 pm and 5:00 pm on Mondays, Wednesdays and Thursdays, and views content on ABC between 6:00 pm and 9:00 pm during the weekend. The media guidance application may have further monitored that the user does not view content on Disney Channel. Therefore, the media guidance application may determine that the user frequently accesses content on ESPN and ABC.

The media guidance application may identify, based on the viewing habits, a viewing schedule of the user associated with a first content source of the content sources in the first content source bundle. In some embodiments, the viewing schedule specifies a repeated time window in which the user accesses content from the first content source bundle more than a threshold number of days. For example, after monitoring the viewing habits of the user, the media guidance application may determine that the user tends to watch content on ESPN during the weekdays between 4:00 pm and 5:00 pm, along with content on ABC between 6:00 pm and 9:00 pm during the weekend. The media guidance application may also identify a trend that the user revisits ESPN to view content between 11:00 pm and 11:30 pm during the weekends. Based on the viewing habits, the media guidance application may identify that the user does not access Disney Channel and therefore Disney Channel is not a part of the user's viewing schedule.

The media guidance application may search, based on a user profile, for a given plurality of content sources that are in the second subset of the plurality of content sources and are not in the first subset of the plurality of content sources and that match the user profile of the user. For example, suppose that the second content source bundle is the sports package which consists of content sources ESPN, MLB Network, and NBA TV. The media guidance application may determine that MLB Network and NBA TV are not in the first content source bundle and ESPN is a part of both the first and second content source bundles. Furthermore, the media guidance application may retrieve a user profile that indicates that the user consistently watches ESPN, a content source dedicated to sports content. Therefore, the media guidance application may determine that the user prefers watching sports content. Since the channels MLB Network and NBA TV also feature sports content, the media guidance application may determine that the MLB Network and NBA TV are content sources that match the user profile.

The media guidance application may identify content transmitted by the given plurality of content sources that match the user profile. For example, the content may be a television show, a movie, a sports game, etc., that is featured on the content source. Continuing the previous example, when watching ESPN and ABC, the user may specifically like to watch basketball games featuring the Los Angeles Lakers. The user profile may contain the user's viewing history, which consists of several references to the Los Angeles Lakers. These references may appear in the metadata of the content viewed by the user. For example, the content listing may state "Los Angeles Lakers vs. New York Knicks," "San Antonio Spurs vs. Los Angeles Lakers," and "History of the Los Angeles Lakers." The media guidance application may further monitor content being transmitted by MLB Network and NBA TV. The media guidance application may determine that MLB Network does not feature any content that matches the user profile. However, it may find content such as "The Greatest Players of the Los Angeles Lakers" that is featured on NBA TV. Since the user profile indicates that the user prefers to watch content related to the Los Angeles Lakers, the media guidance application may identify the content as matching the user profile.

The media guidance application may determine a transmission schedule of the identified content. In some embodiments, the transmission schedule comprises scheduling information specifying a transmission schedule of each media asset transmitted by the given plurality of content sources. For example, "The Greatest Players of the Los Angeles Lakers" may be a weekly documentary series that may discuss the careers of famous players of the Los Angeles Lakers. The media guidance application may determine that the show is transmitted on NBA TV on Thursdays between 5:30 pm and 6:30 pm.

The media guidance application may compare the transmission schedule of the identified content with the viewing schedule of the user. For example, the media guidance application may determine that the user consistently watches television between 4:00 pm and 9:00 pm on weekdays every week. As previously noted, the user accesses content on ESPN between 4:00 pm and 5:00 pm. The media guidance application may determine that the transmission schedule of the content on NBA TV, "The Greatest Players of the Los Angeles Lakers," does not conflict with the transmission schedule of the content the user accesses on ESPN. Thus, the user can potentially view the content on NBA TV.

The media guidance application may select a second content source of the given plurality of content sources based on the comparison. In some embodiments, the media guidance application selects the second content source in response to determining that the transmission schedule of the identified content transmitted by the second content source does not overlap with the viewing schedule of the user associated with the first content source in the first content source bundle. For example, upon determining that the transmission schedules of "The Greatest Players of the Los Angeles Lakers" and the content the user accesses on ESPN do not conflict, the media guidance application may select NBA TV.

In some embodiments, the media guidance application may determine that the transmission schedule of the identified content transmitted by the second content source overlaps with the viewing schedule of the user associated with the content in the first content source bundle. In response, the media guidance application may request user confirmation to select the second content source. The media guidance application may further select the second content source in response to user confirmation to select the second content source. For example, if the user accesses content on ESPN between 4:00 pm and 5:00 pm and the "The Greatest Players of the Los Angeles Lakers" is transmitted on NBA TV between 4:30 pm and 5:30 pm, the media guidance application may determine that there is a thirty-minute overlap between the user's viewing schedule and the transmission schedule of the content source. The media guidance application may then prompt the user that NBA TV features "The Greatest Players of the Los Angeles Lakers," which is transmitted at 4:30 pm every Thursday. The media guidance application may request that the user decide if he/she wants to select NBA TV to add to the user's content source bundle.

The media guidance application may modify the first content source bundle to add the selected second content source. For example, the media guidance application may add NBA TV to the user's economy package. Therefore, the modified economy package would consist of ESPN, ABC, NBA TV, and Disney Channel. In some embodiments, the media guidance application may remove a third content source from the first subset of the first content source bundle based on the modification to the first content source bundle. In the previous example, it was noted that the user does not access Disney Channel and content featured on Disney Channel is not a part of the user's viewing schedule. In response, the media guidance application may remove Disney Channel from the user's modified economy package. In some embodiments, the first content source bundle is associated with a first cost and the second content source bundle is associated with a second cost. The media guidance application may adjust the first cost based on modifying the first content source bundle. For example, suppose that the stand-alone economy package costs $50 monthly. Suppose that each content source (e.g., channel) costs $5. Therefore, adding a content source to the content source bundle increases the monthly cost by $5, and removing a content source reduces the monthly cost by $5. In the given scenario, adding NBA TV to the user's economy package increases the monthly cost to $55. If the media guidance application further removes Disney Channel, the monthly cost returns to $50.

In some embodiments, the media guidance application may determine that a percentage of the content sources in the first content source bundle viewed by the user is less than a threshold. In response to determining that the percentage is less than the threshold, the media guidance application may modify the first content source bundle. For example, the user may be subscribed to the sports package. Suppose that the sports package contains five content sources (e.g., channels). The user may be accessing only one channel and may choose not to access the remaining channels because the respective content of the latter is not of interest to the user. Therefore, the media guidance application may determine from the viewing schedule of the user that only 20% of the channels are being accessed. Suppose that the threshold is set to 60% (i.e., three channels out of five are being accessed to view content). The media guidance application may determine that because the user views only 20% of the first content source bundle, a value less than the 60% threshold, the first content source bundle needs to be modified. As discussed previously, modifying a content source bundle may involve adding content sources, removing content sources, or swapping content sources from other content source bundles.

In some embodiments, the media guidance application may characterize the user based on the viewing habits. The media guidance application may identify a second user based on the characterization of the user and enable the second user to subscribe to the modified first content source bundle in response to identifying the second user based on the characterization. For example, the user's viewing habits may consist of several basketball games. The media guidance application may characterize the user as a fan of sports. Furthermore, the user's first content source bundle may be a modified first content bundle that heavily focuses on sports-related content sources. The media guidance application may identify a second user that is also characterized as a sports fan and enable him/her to subscribe to the modified first content source bundle.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of an illustrative process for managing user subscriptions to content sources in accordance with some embodiments of the disclosure;

FIG. 8 is a flowchart of an illustrative process for determining user subscription to a content source bundle in accordance with some embodiments of the disclosure;

FIG. 12 is a flowchart of an illustrative process for enabling a second user to subscribe to the modified first content source bundle in accordance with some embodiments of the disclosure;

FIG. 13 is a flowchart of an illustrative process for identifying a viewing schedule of the user associated with a first content source in accordance with some embodiments of the disclosure.

DETAILED DESCRIPTION

Figure 1:
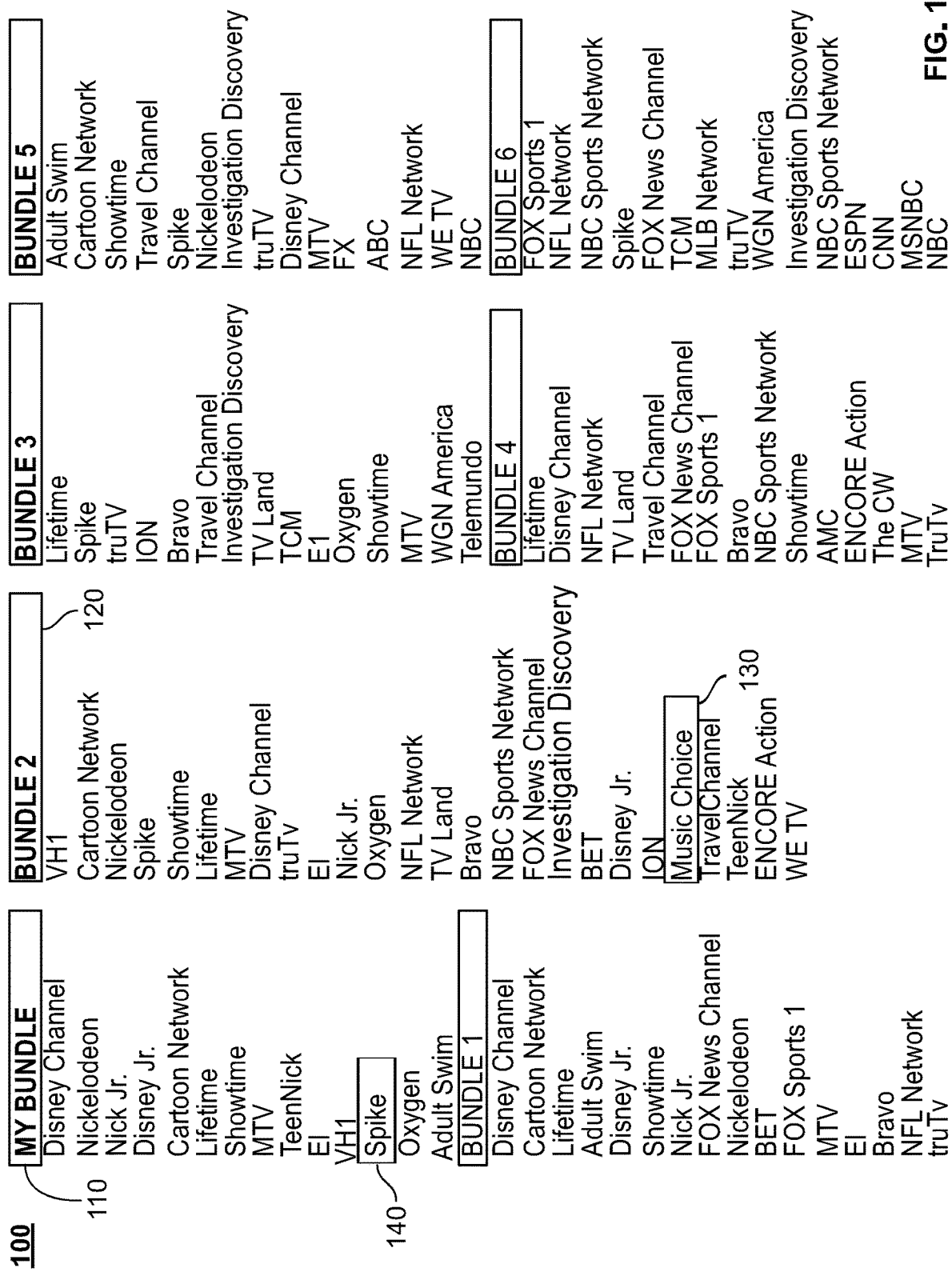
FIGS. 1, 2 and 3 show illustrative examples of display screens generated by a media guidance application in accordance with some embodiments of the disclosure.

Systems and methods are described to manage user subscriptions to content sources. The media guidance application modifies content source bundles in order to tailor them towards user preferences. By aligning content source bundles with viewer desires, the media guidance application optimizes both content coverage for audiences and revenue generation for content providers.

Consider a scenario in which a user is subscribing to a channel package offered by a digital content provider (e.g., Time Warner Cable). Suppose that Time Warner Cable offers several unique channel packages (e.g., economy package, silver package, gold package, etc.). Some of the channels may be offered in multiple packages, while some channels are exclusive to specific packages. The user cannot determine which package to subscribe to because some channel packages feature channels that the user desires to watch, while other channels are of no interest to the user. Suppose that one package (e.g., a platinum package) exists with all of the channels offered by Time Warner Cable, but the user simply cannot afford the package. Even if the platinum package features all of the channels that the user plans to view, it may also include several channels that the user does not want to view. Therefore, a subscription to the platinum package may not be cost-effective because the user may end up accessing only a small percentage of the package. Furthermore, the user may desire to pay an amount for the subscription that is proportional to the percentage of access (e.g., if the user consistently accesses only 20% of the channels in a package, he/she should be billed 20% of the complete cost of the package). Suppose the user decides to settle on a bundle that features only some of the channels that he/she desires to access. The user may instead rely on the media guidance application to create a modified channel package that includes channels relevant to the user and to adjust the cost of the package accordingly.

The media guidance application may store a plurality of content source bundles wherein a first content source bundle includes a first subset of a plurality of content sources and a second content bundle includes a second subset of the plurality of content sources. A content source may be a source that transmits or broadcasts content to a plurality of users at a scheduled time, or an on-demand source that allows the user to select which content the user wants to receive. For example, a content source can be a television channel with scheduled television programs. A content source bundle may be defined as a collection of content sources. For example, a content source bundle may be a package of multiple television channels and on-demand sources. The media guidance application may determine that a user has a subscription to the first content source bundle, wherein the subscription enables the user to access the first subset of content sources in the first content source bundle. The media guidance application may monitor viewing habits of the user relative to the first subset of content sources in the first content source bundle. Viewing habits include, but are not limited to, types of content viewed, time spent viewing content, frequency of viewing content, and method of access (e.g., on smartphone, television, computer device, etc.). The media guidance application may modify the first content source bundle to add a first content source from the second subset of the content sources in the second content source bundle based on the viewing habits of the user.

The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data (for broadcasters' or providers' logos, etc.), media format (e.g., standard definition, high definition, 3D, etc.), on-demand information, blogs, websites, and any other type of guidance data that is helpful for a user to navigate among and locate desired content selections.

Suppose that a content provider (e.g., Time Warner Cable) has seven unique content source bundles (e.g., channel packages). The user has a subscription to one of the channel packages which features fourteen channels. These channels include Disney Channel, Nickelodeon, Cartoon Network, MTV, VH1, Spike, Oxygen, etc. The media guidance application stores the content source bundles offered by Time Warner Cable and begins to monitor the user's viewing activity to determine viewing habits. The media guidance application may determine that the user prefers viewing content on channels such as Disney Channel, VH1, and MTV, and does not view content on channels such as Spike at all. The media guidance application may retrieve the user's profile and further analyze the user's viewing history. The media guidance application may determine that the user's viewing schedule involves viewing content on MTV and VH1 during evenings on a daily basis, while viewing content on Disney Channel on weekend mornings. Based on the metadata associated with the content viewed by the user, the media guidance application may determine that the user prefers watching content associated with music and animation. The media guidance application may then search for content sources in another content source bundle that are not in the user's content source bundle but that match the user's preference. The media guidance application may identify Music Choice, which belongs in a separate content source bundle offered by Time Warner Cable. Furthermore, the media guidance application may identify content on Music Choice that matches the user profile. For example, the content may be a show that features music videos from Disney movies that airs on weekend afternoons. The media guidance application may determine that the user's viewing schedule does not conflict with the scheduled transmission of the content. Therefore, the media guidance application may suggest adding Music Choice to the user's content source bundle. In some embodiments, the media guidance application may generate, for display, all of the available content source bundles with their respective content sources and highlight suggestions.

FIG. 1 shows an illustrative example of a display screen 100 generated by the interactive media guidance application in accordance with some embodiments of the disclosure. In the example, the interactive media guidance application is displaying all seven of the content source bundles (e.g., Bundle 1, Bundle 2, etc.) offered by the content provider. Each content source bundle has multiple content sources listed alongside. For example, Bundle 5 has content sources including Adult Swim, Cartoon Network, Showtime, etc.

The first content source bundle 110 represents the content source bundle for which the user has a subscription. Accordingly, it is titled "My Bundle." In this example, the first content source bundle has not yet been modified by the media guidance application. It contains channels including Disney Channel, Nickelodeon, MTV, VH1, Spike, etc. As proposed previously, suppose that the user has simply settled for this bundle because it features some channels of interest and is affordable for the user. The user consistently watches content on Disney Channel, MTV, and VH1, but only occasionally watches content on the remaining channels. In addition, the user rarely watches content on Spike. The media guidance application may search for alternative content sources in the other content source bundles.

The second content source bundle 120 represents and alternative bundle from which the media guidance application may potentially find content sources that match the user's preferences. It is important to note that various content source bundles may vary in size. For example, the second content source contains more channels than the first content source. Content sources may also be shared among different bundles. For example, the content source Disney Channel appears in both the first and second content source bundles. The media guidance application may search for unique content sources that do not appear in the first content source bundle. For example, Music Choice does not appear in the first content source bundle.

The media guidance application may monitor the viewing habits of the user relative to the first subset of content sources in the first content source bundle. For example, the media guidance application may track the viewing history of the user relative to the first content bundle. For example, the media guidance application may analyze how often the user accesses the content sources and the time spent on each. In this case, the media guidance application may have monitored that the user views content on MTV between 5:00 pm and 6:00 pm and views content on VH1 between 8:00 pm and 9:00 pm on weekdays on his/her television. The media guidance application may have further monitored that the user views content on Disney Channel on the weekends between 10:00 am and 11:00 am. The content that the user views may range from music videos, animated shows and Disney movies to documentaries about various music artists. Furthermore, the user may sporadically watch other channels such as Nickelodeon and Nick Jr. The media guidance application may determine that the user has not accessed the channel Spike. Based on these viewing habits, the media guidance application may determine that the user prefers watching content related to music and animation.

The recommended content source 130 represents a second content source that matches the user profile and is not already in the first content source bundle. For example, Music Choice may be a content source that the matches the user's profile because it features content geared towards music. Furthermore, Music Choice may feature a specific content that more appropriately matches the user's preferences. Based on the user profile, the media guidance application may attempt to identify content that features music, animation, and Disney. If Music Choice has a show "Disney Music Videos" that is broadcasted between 1:00 pm and 1:30 pm on weekends, the media guidance application may determine that "Disney Music Videos" matches the user's profile and does not overlap with the user's viewing schedule associated with content sources from the first content source bundle.

In some embodiments, the media guidance application may analyze metadata and media settings associated with the content viewed by the user to determine the user's viewing habits. For example, the user may view content on a certain content source. The media guidance application may retrieve metadata associated with the content being viewed by the user. This metadata may include, but is not limited to, content descriptions, keywords, themes, genre labels and subtitles. It should be noted that viewing habits are not necessarily limited to themes or keywords such as "music," "animation," "Disney," etc. For example, the user may set the media settings by turning on Spanish subtitles or Spanish audio. The media guidance application may thus determine that the user prefers to view content in the Spanish language and match content sources such as Telemundo that feature shows in Spanish, with the user profile. In addition, the user may view a lot of movies instead of television shows. Even if the user does not have a preference of genre, the media guidance application may match content sources such as HBO and Showtime, which primarily feature movies, with the user profile.

In some embodiments, the media guidance application may identify a second content source based on the ratings and popularity of the second content source. For example, the media guidance application may notice that the user profile has sporadic preferences. The user may watch very little content, or may not prefer a specific type of genre. Furthermore, the media guidance application may note that the user tends to watch content at specific times (e.g., weekday evenings), but does not watch content completely (e.g., frequently changes among content sources). The user may simply not be satisfied with the selection of content sources. In response, the media guidance application may search for content that is popular (i.e., highly watched and highly rated by viewers). For example, the media guidance application may refer to the Internet to retrieve content ratings and viewership sizes. The media guidance application may refer to a threshold rating and a threshold viewership size to determine if the content is popular (e.g., determines that the content's rating and viewership size exceed the respective thresholds). The media guidance application may also have a popular content threshold. The popular content threshold may be the amount of unique content, which is deemed popular by the media guidance application, that is needed for a content source to qualify as being popular. For example, suppose that the media guidance application determines that the content "Game of Thrones," which is featured on the content source HBO, has a content rating of 4.5 out of 5 and has a viewership size of 10 million daily viewers. If the threshold rating is 4 out of 5 and the threshold viewership size is 5 million daily viewers, the media guidance application may determine that "Game of Thrones" is a popular show. The media guidance application may also determine that "Last Week Tonight" is another show on HBO that qualifies as being popular due its rating and viewership size. Suppose that the popular content threshold is two. The media guidance application may then determine that HBO has at least two popular shows (e.g., meets the popular content threshold) and is not a part of the user's first content source bundle. The media guidance application then may select HBO as a second content source.

In some embodiments, the media guidance application may identify a second content source based on the user's location. For example, if the user lives in New York City and watches sports content, the media guidance application may identify YES Network, a channel that focuses on the New York Yankees (i.e., a baseball team associated with New York City), as a possible candidate for the user's first content source bundle. Furthermore, the user may view content on his/her mobile device. Mobile devices may track the user's location and store this information in the user profile. The media guidance application may notice that the user regularly visits several comedy clubs and may identify Comedy Central, a content source focused on comedy, as a possible candidate for the user's first content source bundle.

In some embodiments, the media guidance application may refer to the user's browsing history to identify a second content source. For example, the user may search for food recipes on the Internet through his/her mobile device or Smart TV. The media guidance application may identify keywords such as "food" and "recipes" to identify Food Network, a content source focused on food preparation, as a possible candidate for the user's first content source bundle.

Once the media guidance application has identified a second content source as a possible candidate to add to the first content source bundle, the media guidance application may identify specific content featured in the second content source that the user may wish to view based on his/her user profile. The media guidance application may retrieve the transmission schedule of the content and determine if the transmission schedule overlaps with the viewing schedule of the user. In some embodiments, the media guidance application selects the second content source in response to determining that the transmission schedule of the identified content transmitted by the second content source does not overlap with the viewing schedule. Whereas in some embodiments, the media guidance application may determine that the transmission schedule of the identified content transmitted by the second content source overlaps with the viewing schedule of the user associated with the content in the first content source bundle. In response, the media guidance application may request user confirmation to select the second content source. The media guidance application may further select the second content source in response to user confirmation to select the second content source.

In FIG. 1, the recommended content source 130 can therefore be selected by the media guidance application because it matches the user's profile and features content with a transmission schedule that may not conflict with the user's viewing schedule. The media guidance application may then add the recommended content source 104 to the first content source bundle.

The removable content source 140 represents a content source that the user does not access. In the previous example, the user did not view content on Spike. Spike may be a channel that the user has purchased in the bundle, but its removal will not affect the user's viewing schedule. Therefore, the media guidance application may remove the content source from the user's first content source bundle.

In some embodiments, the media guidance application may replace the removable content source with another content source from the second content source bundle. For example, if the user does not view content on Spike, the media guidance application may replace Spike with Bravo, a content source found in Bundle 1. Even if Bravo does not match the user profile, the swap can allow the user to access content that he/she may not previously have been aware of, but may potentially prefer.

In some embodiments, the user may require that the media guidance application request confirmation from the user before adding or removing content sources. For example, the display screen 100 may serve as a recommendation aggregator and the user may select the removable content source 140 to confirm removal or may select the recommended content source 130 to confirm the addition. The recommended content source may be distinguishable from the other content sources by an identifier (e.g., green font, green outline, a star, a circle, etc.). The removable content source may also be distinguishable by an identifier (e.g., red font, red outline, a star, a circle, etc.).

In some embodiments, the user may allow the media guidance application to automatically add or remove content sources. For example, the display screen 100 may serve as a summary of the changes made to the user's first content source bundle. The user may refer to the display screen 100 to determine the new set of content sources that the user has access to.

In some embodiments, the first content source bundle is associated with a first cost and the second content source bundle is associated with a second cost. The media guidance application may adjust the first cost based on modifying the first content source bundle. For example, suppose that the user's first content source bundle costs $50 monthly. Suppose that each content source (e.g., channel) costs $5. Therefore, by adding the recommended content source 130 (e.g., Music Choice), the content source bundle increases the monthly cost by $5. Removing the removable content source 140 (e.g., Spike) may reduce the monthly cost by $5. In some embodiments, the prices of the content sources may be written alongside each content source on the display screen 100.

Figure 2:
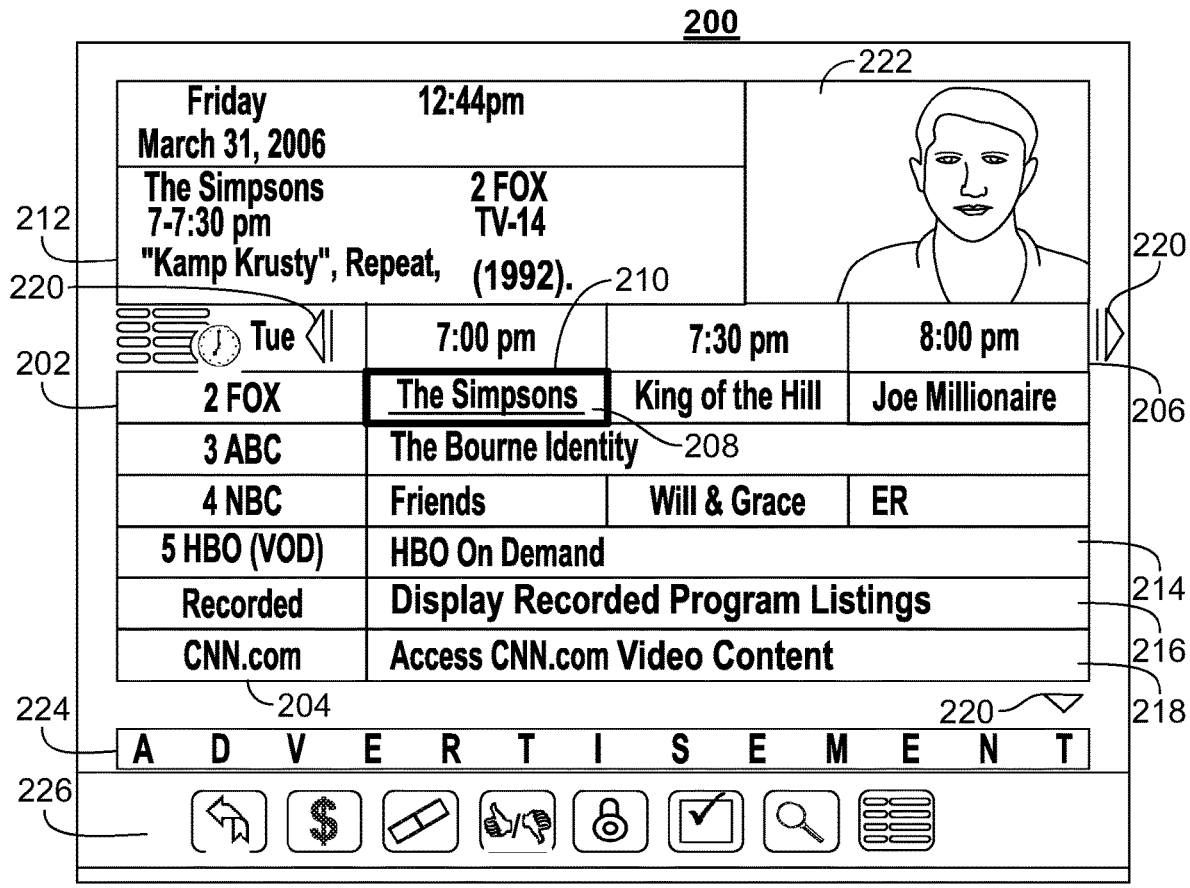

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. In some embodiments, display 200 may include a selectable option (not shown) to access a display of a list of scheduled recordings. For example, the media guidance application may generate for display the list of scheduled recordings that is similar to a display generated for display in response to a selection of third selectable option 128 of FIG. 1. In some embodiments, the display 110 of FIG. 1 may be generated for display over grid display 200 upon invoking the display 200, instead of over a video of a media asset. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. For example, the media guidance application may determine through monitoring content the user access, the preference hierarchy of teams that was discussed in reference to the selection of second selectable option 126 in FIG. 1. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 3:
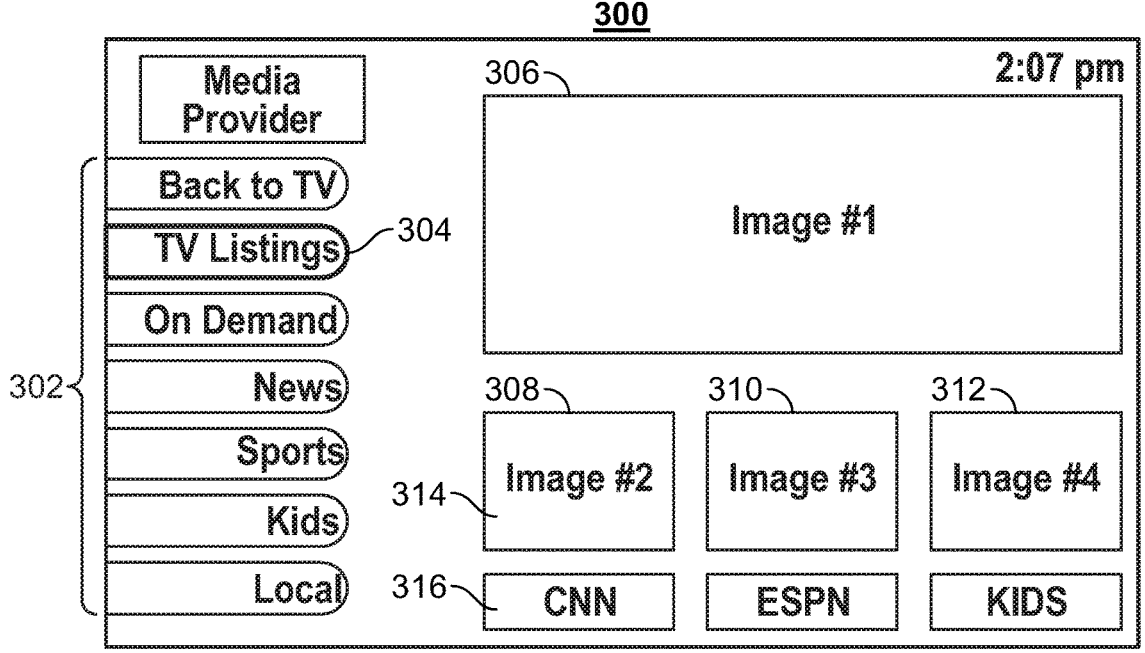

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In some embodiments, the display 110 of FIG. 1 may be generated for display over grid display 300 upon invoking the display 300, instead of over a video of a media asset. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
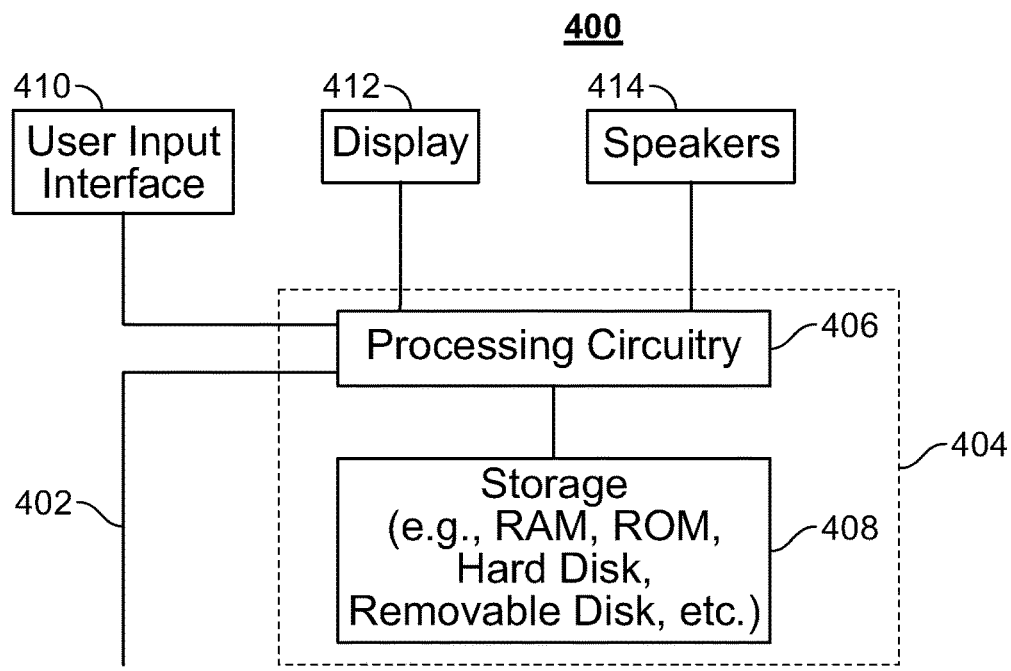
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
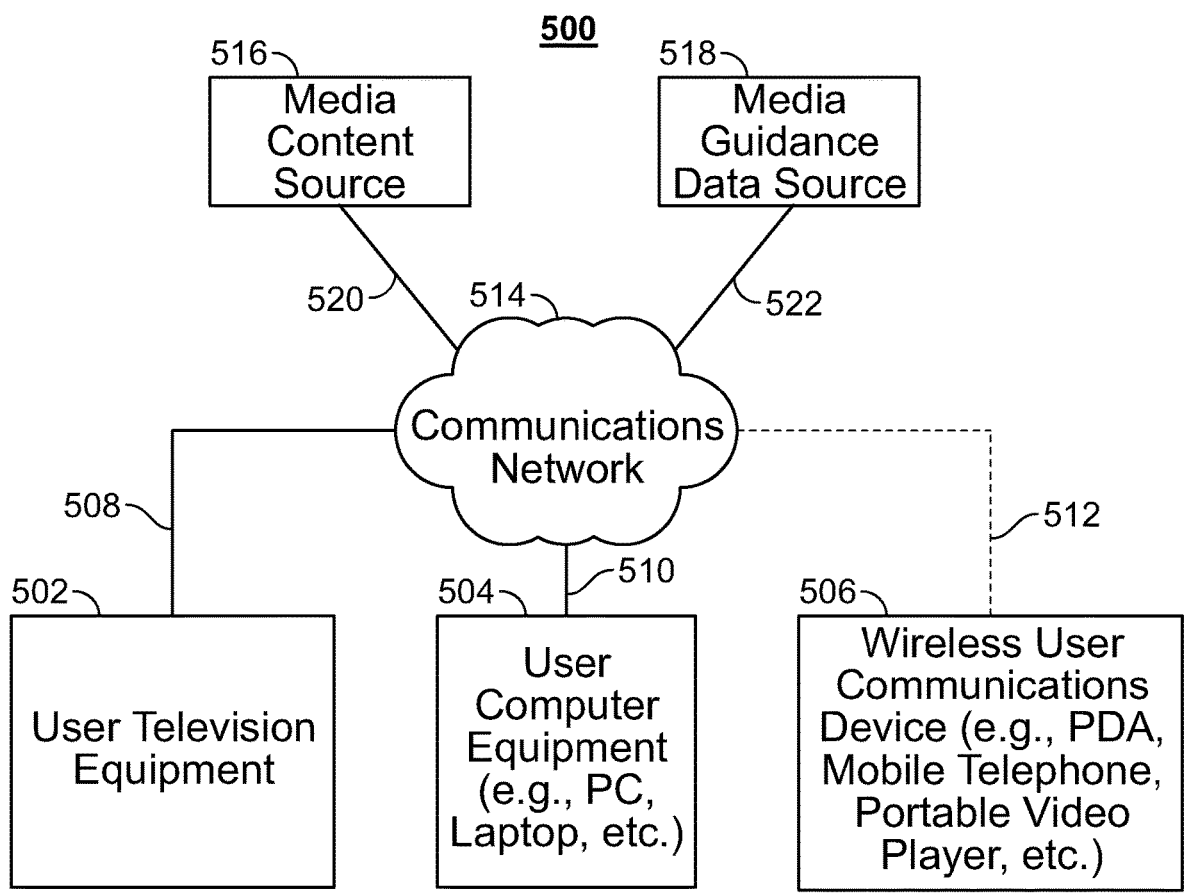
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device. In some embodiments, the OTT sources may include Internet data sources such as RSS feeds, social media sources, news sources, or other sources that are updated at a more frequent interval than conventional media guidance data. For example, the OTT sources may include a database from which blobs of data (e.g., javascript object notation (JSON) data, or any other suitable data format) for sporting events may be queried and retrieved by user equipment devices 402, 404, and 406.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4. In some embodiments, the cloud resources may include data sources such as RSS feeds, social media sources, news sources, or other sources that are updated at a more frequent interval than conventional media guidance data. For example, the cloud resources may provide data (e.g., javascript object notation (JSON) data, or any other suitable data format) for sporting events and may be queried and retrieved by user equipment devices 402, 404, and 406.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 is a flowchart of illustrative steps of a process 600 for managing user subscriptions to content sources in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to manage user subscriptions to content sources. In addition, one or more steps of process 600 may be incorporated into or combined with one or more steps of any other process or embodiment (e.g., as described in relation to FIGS. 1 and 7-14).

At step 602, control circuitry 404 stores, in storage 408, a plurality of content source bundles. The content source bundles may be retrieved from media content source 516, wherein a first content source bundle includes a first subset of a plurality of content sources and a second content bundle includes a second subset of the plurality of content sources.

At step 604, control circuitry 404 determines that a user has a subscription to the first content source bundle, wherein the subscription enables the user to access the first subset of content sources in the first content source bundle. The subscription information of the user can be retrieved from the media guidance data source 518. Furthermore, the user may log in to the user account via the user input interface 410 through the I/O path 402 to access and confirm the subscription.

At step 606, control circuitry 404 monitors viewing habits of the user relative to the first subset of content sources in the first content source bundle. Control circuitry 404 may retrieve the user's viewing information, such as time of access, duration of access, and content metadata from the media guidance data source 518. The user may view content using user television equipment 502, user computer equipment 504, or a wireless user communications device 506. Viewing history of the user may be placed in storage 408.

At step 608, control circuitry 404 modifies the first content source bundle to add a first content source from the second subset of the content sources in the second content source bundle based on the viewing habits of the user. Control circuitry 404 may refer to the user profile in storage 408 and compare the user's viewing history with content from a first content source from the second subset of content sources in the media content source 516. Specifically, control circuitry 404 may compare the content metadata from the user's viewing history with the content metadata from the media guidance data source 518 that is associated with the first content source to determine if there is a match.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 6.

Consider a scenario in which a user has subscribed to a first content source bundle (e.g., basic cable package) with four content sources (e.g., channels) including FOX, ABC, CNN, and Comedy Central. The content provider (e.g., Cablevision) may allow the user to access these content sources on his/her mobile device or a set-top box. The content provider may also have a second content source bundle that contains four content sources including HBO, MLB Network, CNN, and History Channel. The user may prefer viewing content on a mobile device on weekdays and on a set-top box on weekends. The user may limit his/her viewing per day to two hours between 8:00 pm and 10:00 pm. It is possible that the user may spend the first hour watching CNN News every day, and may spend the following hour switching channels and watching small segments of various content. The user may also not view content Comedy Central.

Figure 7:
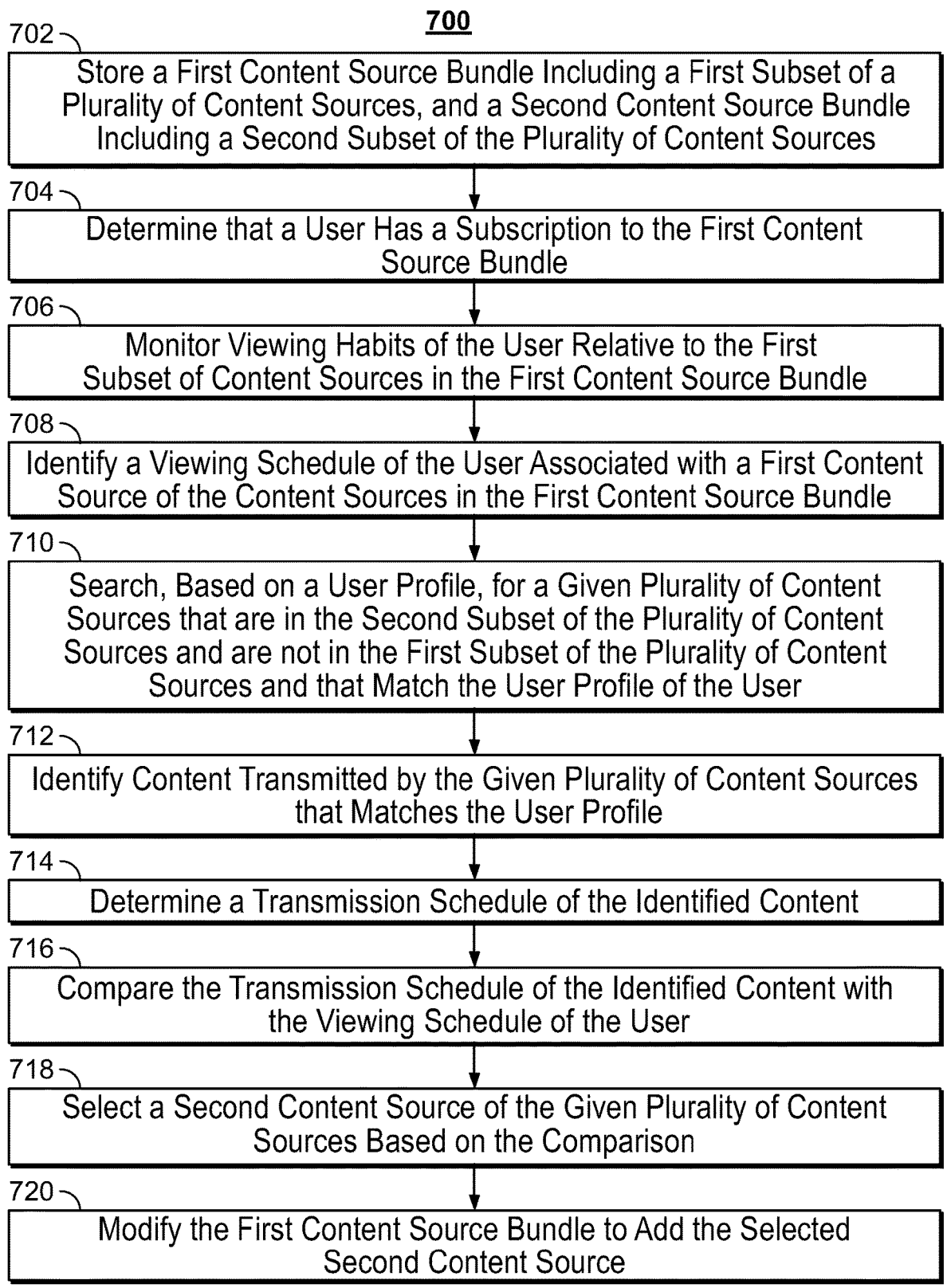
FIG. 7 is a flowchart of a detailed illustrative process for managing user subscriptions to content sources in accordance with some embodiments of the disclosure.

FIG. 7 is a flowchart of illustrative steps of a process 700 for managing user subscriptions to content sources in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to manage user subscriptions to content sources. In addition, one or more steps of process 700 may be incorporated into or combined with one or more steps of any other process or embodiment (e.g., as described in relation to FIGS. 1, 6 and 8-14).

At step 702, control circuitry 404 stores a plurality of content source bundles in storage 408 wherein a first content source bundle includes a first subset of a plurality of content sources and a second content source bundle includes a second subset of the plurality of content sources. For example, the plurality of content source bundles may be various packages that a content provider (e.g., Cablevision) may offer to users through the media content source 516 (e.g., basic cable package, silver package, gold package, etc.). The plurality of content sources may be all the channels that a content provider offers (e.g., HBO, FOX, ABC, CNN, etc.). Therefore, a subset of the plurality of content sources may be a selection of the plurality of content sources that is a part of the content source bundle. For example, FOX, ABC, and CNN may be a subset of the plurality of content sources (e.g., HBO, FOX, ABC, CNN, etc.) and may be included in a content bundle (e.g., basic cable package).

At step 704, control circuitry 404 determines that a user has a subscription to the first content bundle, wherein the subscription enables the user to access the first subset of content sources in the first content source bundle. Control circuitry 404 may retrieve the user subscription information from the media guidance application 518 and the user profile accessible from storage 408. As stated in the example, the user may have a subscription to the first content source bundle, the basic cable package. Accordingly, the user is enabled access to four content sources: FOX, ABC, CNN and Comedy Central.

At step 706, control circuitry 404 monitors the viewing habits of the user relative to the first subset of content sources in the first content source bundle. Viewing habits may be monitored using various sources such as the media guidance data source 518, which may provide metadata associated with the content viewed by the user (e.g., from the media content source 516). As stated in the example, the user may access content from a set-top box (e.g., user television equipment 502) or a mobile device (e.g., user computer equipment 504 and wireless user communications device 506). In terms of mobile devices, the user may use a laptop or a smartphone. Viewing habit information may include the equipment used to access content. It may also include information regarding the content the user has already viewed. For example, the media guidance application may track the viewing history of the user relative to the first content bundle and place this information in storage 408. Control circuitry 404 may additionally monitor how often the user accesses the content sources and the time spent on each. For example, control circuitry 404 may determine that the user views content in the first content source bundle between 8:00 pm and 10:00 pm on a daily basis. Control circuitry 404 may track that the user spends the first hour watching CNN News every day, and spends the following hour switching channels and watching small segments of various content. The user may also not view content on Comedy Central. Control circuitry may store the user's viewing history in the user profile in storage 408.

At step 708, control circuitry 404 identifies, based on the viewing habits, a viewing schedule of the user associated with a first content source of the content sources in the first content source bundle. For example, after monitoring the viewing habits of the user, it may determine that the user views content in the first content source bundle between 8:00 pm and 10:00 pm on a daily basis. Control circuitry 404 may track that the user spends the first hour watching CNN News every day. Therefore, the content CNN News, which is transmitted on the content source CNN, is part of the viewing schedule. Control circuitry 404 may track that the user spends the following hour switching channels. This may indicate that the user does not have a rigid viewing schedule between 9:00 pm and 10:00 pm. For example, the user may watch content on ABC for ten minutes, switch to FOX for five minutes and then view content on CNN again for twenty minutes before switching channels again. It is possible that the user may change the order and duration of access per day. Control circuitry may determine that there is no defined viewing schedule due to the spontaneous nature of the user's viewing history between 9:00 pm and 10:00 pm. Control circuitry 404 may track that the user does not view content on Comedy Central. The viewing schedule may be placed in storage 408.

At step 710, control circuitry 404 searches, based on a user profile, for a given plurality of content sources that are in the second subset of the plurality of content sources and are not in the first subset of the plurality of content sources and that match the user profile of the user. As stated in the example, suppose that the second content source bundle is the silver package which contains content sources: HBO, MLB Network, CNN, and History Channel. Control circuitry 404 may determine that the user's first content source bundle includes FOX, ABC, CNN, and Comedy Central. In comparison to the first content source package, the second content source bundle may include three unique content sources: HBO, MLB Network, and History Channel. Control circuitry 404 may retrieve the user profile from storage 408 to determine whether these unique content sources match the user profile. Based on the user's viewing history, control circuitry 404 may determine that the user primarily views CNN News on CNN. From the media guidance data source 518, control circuitry 404 may retrieve metadata associated with CNN News. Metadata may include, but is not limited to, content description, schedule, subtitles, genre information, anchor names, etc. Based on the metadata, control circuitry 404 may determine that CNN News is associated with politics, business, government, and history and add these genres to the user's preferences in the user profile. Control circuitry 404 may repeat the metadata analysis process for each of the unique content sources, respectively. The analysis may indicate that History Channel is associated with history, politics and government. Therefore, History Channel matches the user profile and is part of the given plurality of content sources.

At step 712, control circuitry 404 identifies content transmitted by the given plurality of content sources that match the user profile. For example, the content may be a television show, a movie, a sports game, etc., that is featured on the content source. Suppose that control circuitry 404 determines that History Channel is a content source that is not a part of the user's first content source bundle and matches the user profile (e.g., part of the given plurality of content sources). Control circuitry 404 may identify the content "History of US Politics" that is featured on History Channel. It may further determine that the content matches the user's preference because the content is associated with politics and government.

At step 714, control circuitry 404 determines a transmission schedule (e.g., from the media guidance data source 518) of the identified content. For example, "History of US Politics" may be a weekly documentary series that may discuss various political eras and leaders in the United States. The media guidance application may determine that the show is transmitted on History Channel every day between 9:30 pm and 10:00 pm.

At step 716, control circuitry 404 compares the transmission schedule of the identified content with the viewing schedule of the user. The viewing schedule of the user may be retrieved from storage 408. For example, control circuitry 404 may determine that the user watches CNN News between 8:00 pm and 9:00 pm on a daily basis based on the viewing schedule. However, the user may not have a defined viewing schedule between 9:00 pm and 10:00 pm.

At step 718, control circuity 404 selects a second content source of the given plurality of content sources based on the comparison. For example, upon determining that the transmission schedule of "History of US Politics" and the viewing schedule of the user between 9:30 pm and 10:00 pm do not conflict, control circuitry 404 may select History Channel.

At step 720, control circuitry 404 modifies the first content source bundle to add the selected second content source. For example, control circuitry 404 may add History Channel to the user's first content source bundle. This may be executed by enabling the user to access History Channel and updating the user's subscription located in storage 408.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 7.

FIG. 8 is a flowchart of illustrative steps of a process 800 for determining user subscription to a content source bundle in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to determine user subscription to a content source bundle. In addition, one or more steps of process 800 may be incorporated into or combined with one or more steps of any other process or embodiment (e.g., as described in relation to FIGS. 1, 6, 7 and 9-14).

At step 802, control circuitry retrieves from the user profile (e.g., from storage 408), subscription metadata. The subscription metadata may include information such as the content source bundle name and the list of content sources that the user can access. The subscription metadata may further indicate the cost of the content source bundle and whether the content source bundle has been modified by control circuitry 404.

At step 804, control circuitry 404 determines that a user has a subscription to the first content bundle, wherein the subscription enables the user to access the first subset of content sources in the first content source bundle. For example, the user may have a subscription to the first content source bundle, the basic cable package. The subscription may indicate that the user can access the content sources: FOX, ABC, CNN, and Comedy Central.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 8.

Figure 9:
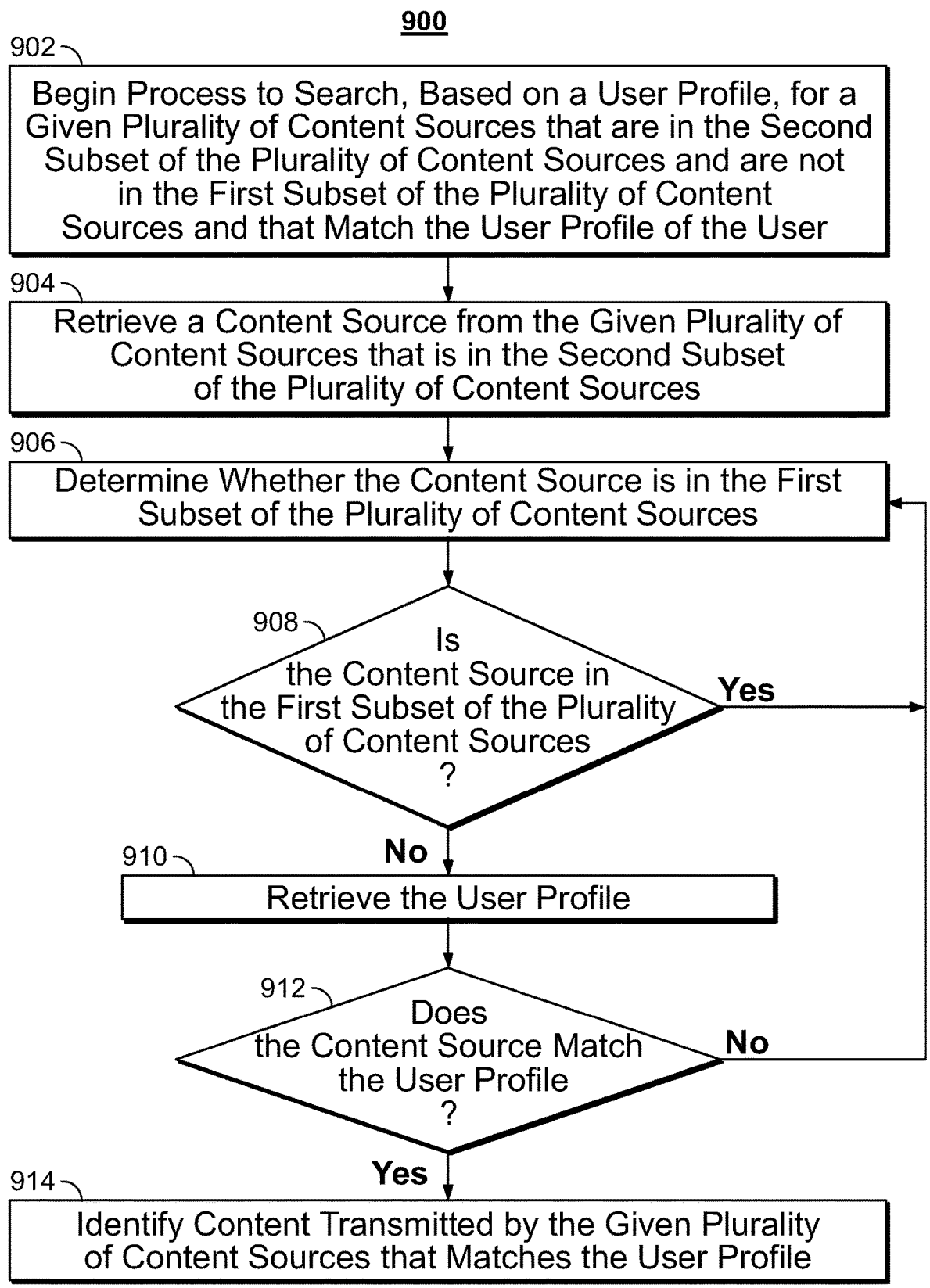
FIG. 9 is a flowchart of an illustrative process for identifying content that matches the user profile in accordance with some embodiments of the disclosure.

FIG. 9 is a flowchart of illustrative steps of a process 900 for identifying content that matches the user profile in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to identify content that matches the user profile. In addition, one or more steps of process 900 may be incorporated into or combined with one or more steps of any other process or embodiment (e.g., as described in relation to FIGS. 1, 6-8, and 10-14).

At step 902, the media guidance application begins the process of searching, based on a user profile, for a given plurality of content sources that are in the second subset of the plurality of content sources and are not in the first subset of the plurality of content sources and that match the user profile of the user. For example, control circuitry 404 may attempt to find channels that are not a part of the user's basic cable package but may be related to the user's preferences. The user profile may contain information such as the user's viewing history, location history, search queries, time of access, duration of access, device usage, etc.

At step 904, control circuitry 404 retrieves a content source from the given plurality of content sources that are in the second subset of the plurality of content sources. For example, control circuitry 404 may refer to storage 408 to retrieve a content source that is associated with the second content source bundle that the user is not subscribed to.

At step 906, control circuitry 404 determines whether the content source is in the first subset of the plurality of content sources. For example, control circuitry 404 may question whether CNN, MLB Network, HBO and History Channel are a part of the user's first content source bundle offered by the content provider.

At step 908, control circuitry 404 decides whether the content source is in the first subset of the plurality of content sources. For example, control circuitry 404 may refer to storage 408 and determine that the user has a subscription that enables access to view content on CNN. Therefore, CNN is in the first subset of the plurality of content sources. In response, the process returns to step 904 to identify another content source. Control circuitry 404 may, however, determine that MLB Network is a content source that is not in the user's first content source bundle.

In response to determining that the content source is not in the first plurality of content streams, control circuitry 404 retrieves (e.g., from storage 408) the user profile at step 910. Suppose that the user views content on his/her mobile device (e.g., smartphone). The smartphone may store the location history of the user. For example, the user may visit several baseball games at stadiums within a week. The smartphone may also track the user's browsing history or social media. For example, the user may search the Internet for information about player statistics or like/post content associated with baseball.

At step 912, control circuitry 404 determines whether the content source matches the user profile. For example, from the media guidance data source 518, control circuitry 404 may retrieve metadata associated with MLB Network. Metadata may include, but is not limited to, content description, schedule, subtitles, genre information, player names, etc. Based on the metadata, control circuitry 404 may determine that MLB Network is associated with baseball, athletics, stadiums and teams. Control circuitry 404 may determine that the user profile indicates that the user preference includes content associated with baseball based on the user location and browsing history. Therefore, the content source MLB Network matches the user profile. If the content source did not match the user profile, the process would return to step 904.

In some embodiments, the media guidance application may identify a second content source based on the ratings and popularity of the second content source. For example, control circuitry 404 may search for content that is popular (i.e., highly watched and highly rated by viewers). For example, the media guidance application may refer to the Internet to retrieve content ratings and viewership sizes or the media guidance data source 518. The media guidance application may refer to a threshold rating and a threshold viewership size in storage 408 to determine if the content is popular (i.e., determines that the content's rating and viewership size exceed the respective thresholds). For example, suppose that the media guidance application determines that the content "Game of Thrones," which is featured on the content source HBO, has a content rating of 4.5 out of 5 and has a viewership size of 10 million daily viewers. If the threshold rating is 4 out of 5 and the threshold viewership size is 5 million daily viewers, the media guidance application may determine that "Game of Thrones" is a popular show. The media guidance application may then determine that HBO is not a part of the user's first content source bundle and select HBO as the content source.

In response to determining that the content source matches the user profile, control circuitry 404 identifies the content source transmitted by the given plurality of content sources that matches the user profile. For example, control circuitry 404 may identify MLB Network as a content source that is not in the user's first content source bundle and matches the user profile.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 9.

Figure 10:
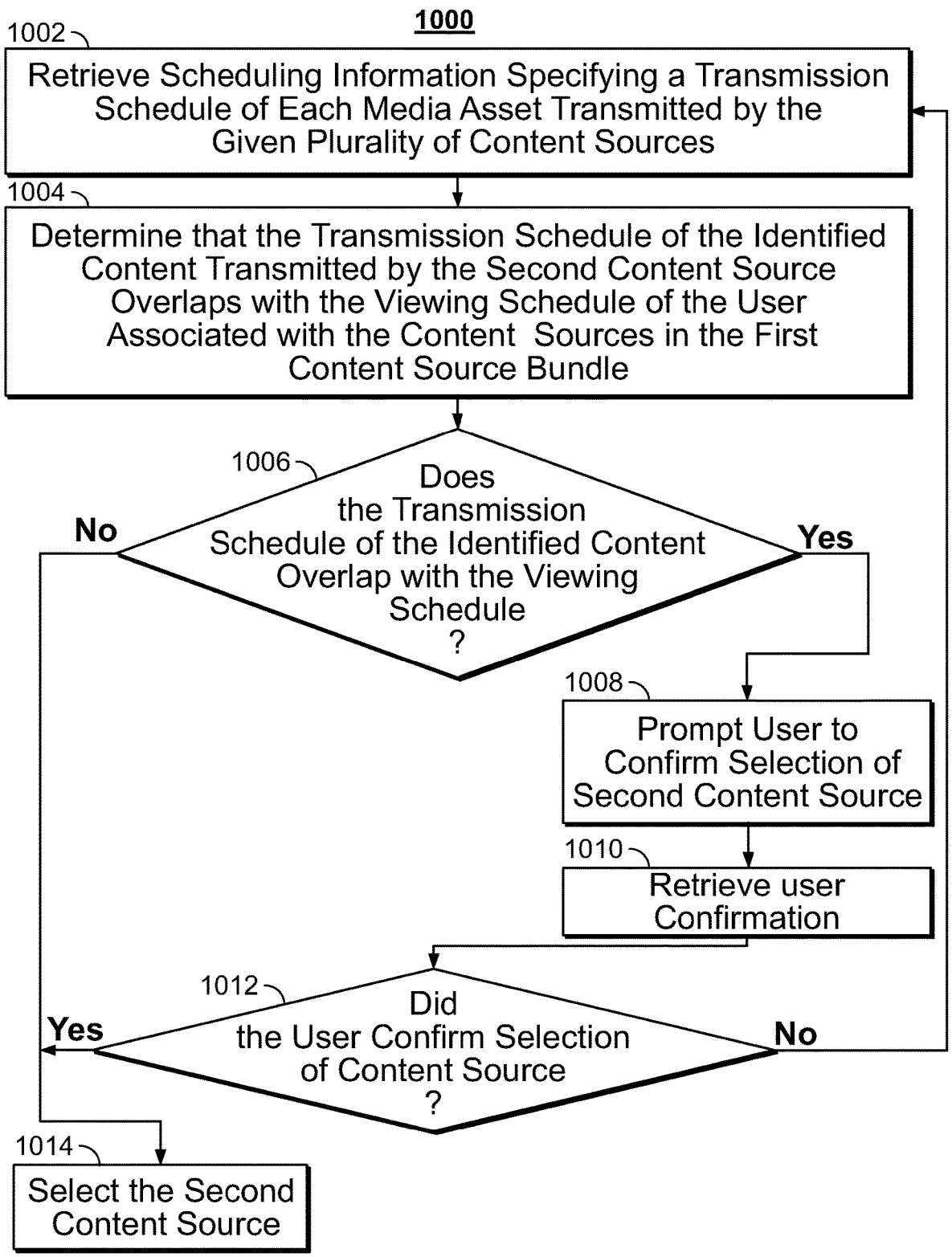
FIG. 10 is a flowchart of an illustrative process for selecting the second content source in accordance with some embodiments of the disclosure.

FIG. 10 is a flowchart of illustrative steps of a process 1000 for selecting the second content source in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to select the second content source. In addition, one or more steps of process 1000 may be incorporated into or combined with one or more steps of any other process or embodiment (e.g., as described in relation to FIGS. 1, 6-9, and 11-14).

At step 1002, control circuitry 404 retrieves scheduling information specifying a transmission schedule of each media asset (e.g., content such as a television show) transmitted by the given plurality of content sources (e.g., content sources that match the user profile and are not in the first content source bundle). This information may be retrieved from the media guidance data source 518. For example, control circuitry 404 may identify a media asset "Daily MLB," which is transmitted on MLB Network and "Game of Thrones," which is transmitted on HBO, and "History of US Politics," which is transmitted on History Channel. The media assets are a part of the given plurality of content sources because HBO, MLB Network and History Channel are not in the first content source bundle. Furthermore, the media guidance data source 518 may indicate that the daily transmission schedules of the media assets are 9:00 pm to 9:30 pm, 10:00 pm to 11:00 pm and 9:30 pm to 10:00 pm, respectively.

At step 1004, control circuitry 404 determines whether the transmission schedule of the identified content transmitted by the second content source overlaps with the viewing schedule of the user associated with the content sources in the first content source bundle. For example, the viewing schedule of the user (e.g., retrieved from user profile in storage 408) may indicate that the user watches CNN News every day between 8:00 pm and 9:00 pm. Furthermore, it may indicate that the user does not show any specific show between 9:00 pm and 10:00 pm and often jumps between different content sources for short periods of time (e.g., user may be uninterested in the content). Control circuitry 404 may compare the viewing schedule with each of the transmission schedules of the media assets.

At step 1006, control circuitry 404 decides whether or not the transmission schedule of the identified content overlaps with the viewing schedule. For example, control circuity 404 may determine that "Daily MLB," "Game of Thrones," and "History of US Politics" do not conflict with the user's viewing schedule. In some cases, the media asset may have a re-run schedule. For example, "Daily MLB" may air the same episode at a later time period (e.g., 11:00 pm to 11:30 pm). Control circuity 404 may identify, based on metadata from the media guidance data source 518, that the second transmission is the same content (e.g., metadata for both transmissions may have the same episode number). In response, control circuitry 404 may consider the transmission schedule that does not overlap with the viewing schedule of the user.

In response to determining that the transmission schedule of the identified content does not overlap with the viewing schedule, control circuitry may select the second content source at step 1014. For example, control circuitry 404 may select HBO, MLB Network and History Channel because they each feature content that matches the user profile.

In response to determine that the transmission schedule of the identified content overlaps with the viewing schedule, the control circuitry 404 prompts the user to confirm selection of the second content source. For example, the prompt may be presented to the user on the display 412 as a user input interface 410. The prompt may come in the form of FIG. 1's display screen 100. The user may have the "Yes" or "No" options or a selectable option (e.g., the user may click on the content sources he/she wishes to select).

At step 1010, control circuitry 404 retrieves the user's confirmation. The user's response may be sent through the I/O path 402. The user may either have selected "Yes" or "No" or selected a content source on the display.

At step 1012, control circuitry 404 determines whether the user confirmed selection of the content source. For example, the user may accept MLB Network and History Channel. In response, the process enters step 1014 and control circuitry 404 selects MLB Network and History Channel. The user may also reject HBO. In response, the process enters step 1016 and control circuitry 404 does not select HBO.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 10.

Figure 11:
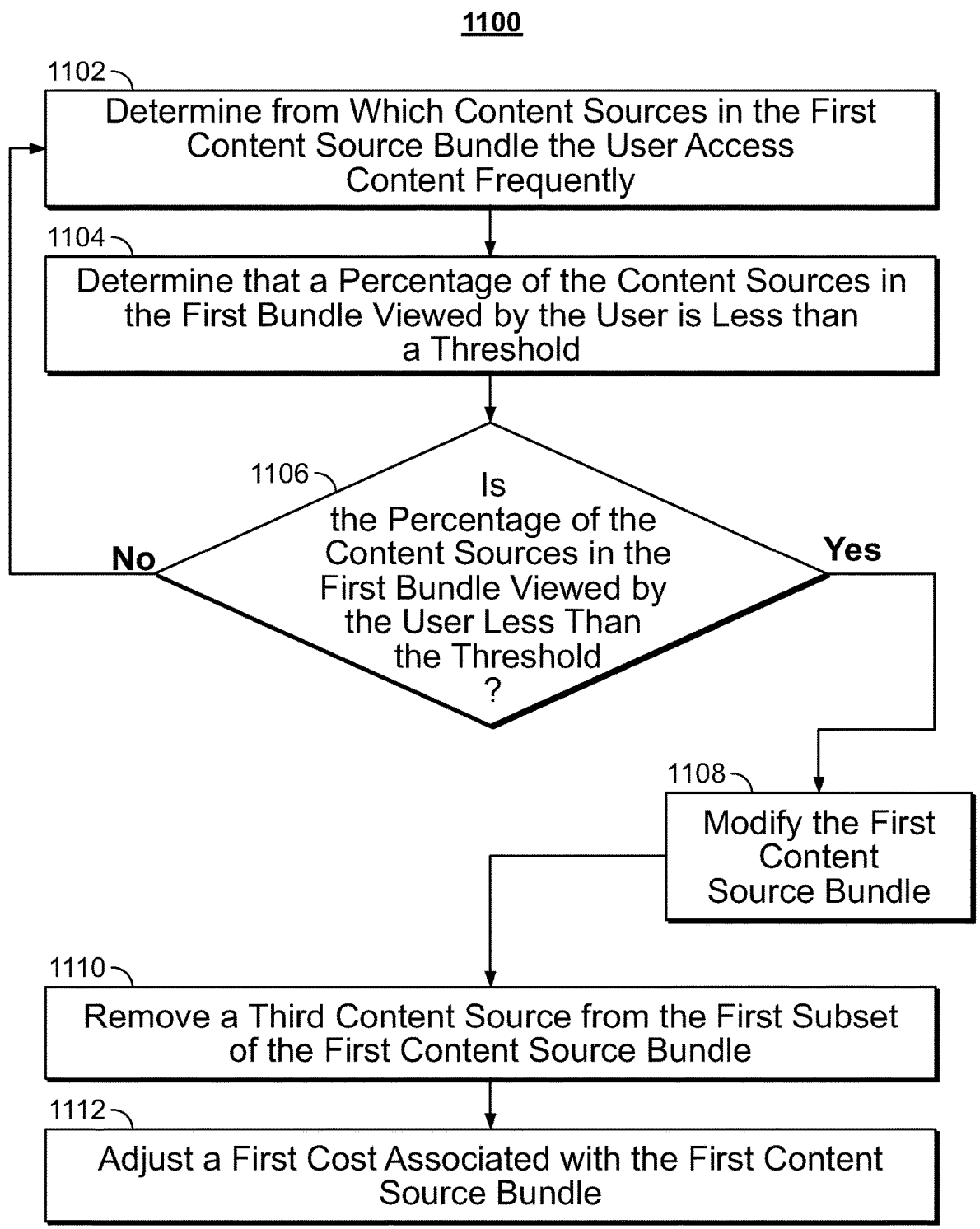
FIG. 11 is a flowchart of an illustrative process for modifying the first content source bundle in accordance with some embodiments of the disclosure.

FIG. 11 is a flowchart of illustrative steps of a process 1100 for modifying the first content source bundle in accordance with some embodiments of the disclosure. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to modify the first content source bundle. In addition, one or more steps of process 1100 may be incorporated into or combined with one or more steps of any other process or embodiment (e.g., as described in relation to FIGS. 1, 6-10, and 12-14).

At step 1102, control circuitry 404 determines from which content sources in the first content source bundle the user access content frequently. For example, the user profile from storage 408 may contain a viewing schedule of the user indicating that the user views CNN News every day. The viewing schedule may also indicate that the user does not view content on Comedy Central.

At step 1104, control circuity 404 may determine that a percentage of the content sources in the first content source bundle viewed by the user is less than a threshold. For example, the user may be subscribed to the basic cable package. Suppose that the basic cable package contains four content sources (e.g., channels). The user may only be accessing one channel and may choose not to access the remaining channels because the respective content of the latter is not of interest to the user. Therefore, the media guidance application may determine from the viewing schedule of the user that only 25% of the channels are being accessed.

At step 1106, control circuitry 404 decides whether the percentage of the content sources in the first content bundle viewed by the user is less than the threshold. Suppose that the threshold (e.g., retrieved from storage 408) is set to 60%. Control circuitry 404 may determine that the user's percentage of access is only 25%, which is less than 60%.

In response to determining that the percentage is less than the threshold, control circuitry 404 modifies the first content source bundle. The media guidance application may determine that because the user only views 25% of the first content source bundle, a value less than the 60% threshold, the first content source bundle needs to be modified. As discussed previously, modifying a content source bundle may involve adding content sources, removing content sources, or swapping content sources from other content source bundles. In other words, process 700 may be initiated to execute a modification. Suppose that control circuitry 404 has selected a second content source as a candidate to add to the user's first content source bundle. Continuing from the example described in FIG. 10, the user may confirm selection of MLB Network and History Channel. In response, control circuitry 404 may update the user's subscription metadata by enabling user access to MLB Network and History Channel and storing the updated subscription metadata in storage 408. In response to determining that the percentage of the content sources in the first bundle viewed by the user exceeds the threshold, the process returns to step 1102 and control circuitry 404 determines the percentage again.

At step 1110, control circuitry 404 removes a third content source from the first subset of the first content source bundle based on the modification to the first content source bundle. In the previous example, it was noted that the user does not access Comedy Central and content featured on Comedy Central is not a part of the user's viewing schedule. In response, the media guidance application may remove Comedy Central from the user's first content source bundle. Control circuitry 404 may update the user's subscription metadata by disabling user access to Comedy Central and storing the updated subscription metadata in storage 408.

At step 1112, control circuitry 404 adjusts the first cost based on modifying the first content source bundle. The first content source bundle is associated with a first cost and the second content source bundle is associated with a second cost. Cost information may be retrieved from the media guidance data source 518. For example, suppose that the content provider charges $40 monthly for the first content source bundle. Suppose that each content source (e.g., channel) costs $10. Therefore, adding a content source to the content source bundle increases the monthly cost by $10 and removing a content source reduces the monthly cost by $5. In the given scenario, adding History Channel and MLB Network to the user's first content source bundle increases the monthly cost to $60. If control circuitry 404 removes Comedy Central, the monthly cost reduces to $50.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 11.

FIG. 12 is a flowchart of illustrative steps of a process 1200 for enabling a second user to subscribe to the modified first content source bundle in accordance with some embodiments of the disclosure. It should be noted that process 1200 or any step thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to enable a second user to subscribe to the modified first content source bundle. In addition, one or more steps of process 1200 may be incorporated into or combined with one or more steps of any other process or embodiment (e.g., as described in relation to FIGS. 1, 6-11 and 13-14).

At step 1202, control circuitry 404 characterizes the user based on the viewing habits. For example, the user's viewing schedule (e.g., retrieved from storage 408) may include the news, baseball, and documentaries. The media guidance application may characterize the user as a fan of baseball, sports, politics, and history. Furthermore, the user's first content source bundle may be a modified first content bundle that includes MLB Network, CNN, MLB Network, FOX, and ABC.

At step 1204, control circuitry 404 identifies a second user based on the characterization of the user. For example, control circuitry 404 search the user profile in storage 408 to access information about the user's social network. The social network may indicate a second user (e.g., user's friend/relative) who has similar interests and likes/posts similar content on social media. For example, control circuitry 404 may determine that the second user can be characterized as a fan of baseball because the second user posts content about baseball on social media. It should be noted that control circuitry 404 may also identify a second user who is not connected to the user.

At step 1206, control circuitry 404 enables the second user to subscribe to the modified first content source bundle in response to identifying the second user based on the characterization. For example, the second user may be shown the display screen 100 from FIG. 1 on his/her own display 412. In some embodiments, the content source bundle 120 may have an identifier labeled "based on users with similar interests." Furthermore, the content sources listed below the identifier may be a part of the user's modified first content source bundle. The second user may then select the modified first content source bundle.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 12.

FIG. 13 is a flowchart of illustrative steps of a process 1300 for identifying a viewing schedule of the user associated with a first content source in accordance with some embodiments of the disclosure. It should be noted that process 1300 or any step thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5)) in order to identify a viewing schedule of the user associated with a first content source. In addition, one or more steps of process 1300 may be incorporated into or combined with one or more steps of any other process or embodiment (e.g., as described in relation to FIGS. 1, 6-12, and 14).

At step 1302, control circuitry 404 retrieves the user profile (e.g., from storage 408) to access the user's viewing history. The user's viewing history may include for example, the content the user has viewed, the content sources accessed by the user, the time of access, the duration of access, the method of access, etc.

At step 1304, control circuitry 404 analyzes the user's viewing history for trends and preferences. The media guidance application may have a recurrence threshold to determine if an activity counts as a trend. For example, if a given activity is repeated more than a specific number of times in a given period of time, the media guidance application may classify the activity with a trend. For example, if the user accesses a content stream every day for five consecutive days and the daily recurrence threshold (e.g., minimum daily activity) is two, control circuitry 404 may determine that the user has a trend of accessing the content stream twice on a daily basis.

In some embodiments, the media guidance application may search for recurring access at specific times. For example, the viewing history may indicate that the user has viewed content every Monday evening at 8:00 pm in a given month. Control circuitry 404 may thus determine that the user has a weekly trend of viewing content on Monday at 8:00 pm. In some embodiments, the media guidance application may search for recurring access of specific content. For example, control circuity 404 may determine, based on the viewing history, that the user has viewed "CNN News" once per day in a given week and may determine that the user has a daily trend of accessing "CNN News." In some embodiments, the media guidance application may search for media settings associated with the viewing history of the user to determine user preference of settings. For example, control circuitry 404 may determine that the user viewed all content (e.g., five different shows) with the audio set to Spanish, and identify the trend that the user prefers the audio set to Spanish.

At step 1306, control circuitry 404 identifies a viewing schedule of the user associated with a first content source of the content sources in the first content source bundle. For example, after monitoring the viewing habits of the user (e.g., analyzing the user's viewing history), control circuitry 404 may determine that the user views content in the first content source bundle between 8:00 pm and 10:00 pm on a daily basis. Control circuitry 404 may track that the user spends the first hour watching "CNN News" every day. Therefore, the content "CNN News," which is transmitted on the content source CNN, is part of the viewing schedule.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 13.

Figure 14:
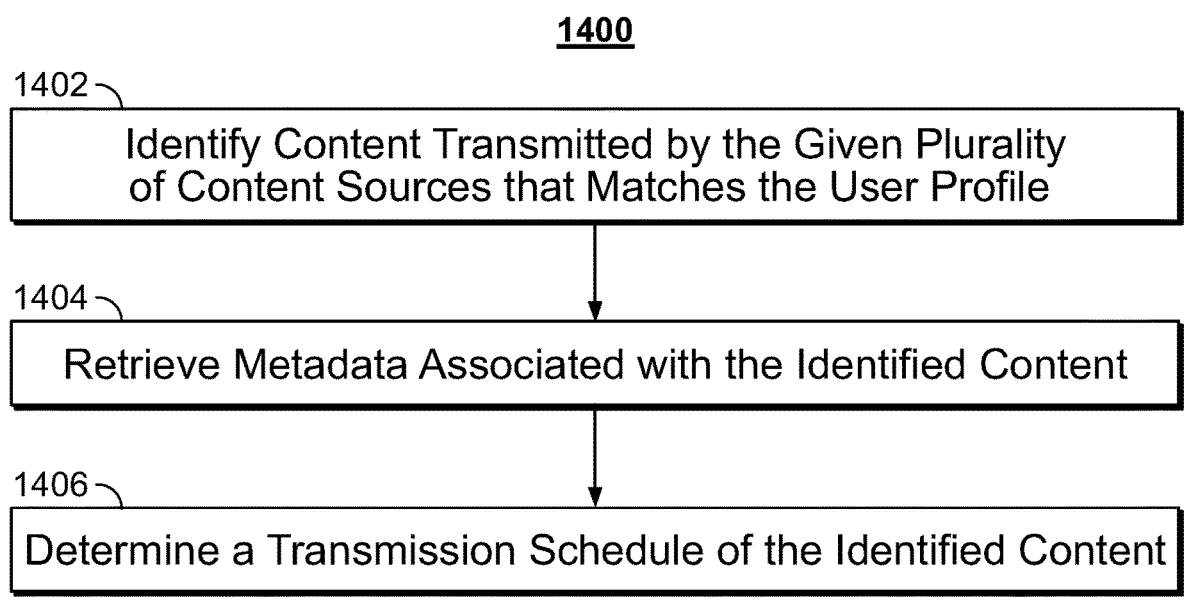
FIG. 14 is a flowchart of an illustrative process for determining a transmission schedule of the identified content in accordance with some embodiments of the disclosure.

FIG. 14 is a flowchart of illustrative steps of a process 1400 for determining a transmission schedule of the identified content in accordance with some embodiments of the disclosure. It should be noted that process 1400 or any step thereof could be performed on, or provided by, any of the devices shown in FIGS. 4-5. For example, process 1400 may be executed by control circuitry 404 (FIG. 4) as instructed by a media guidance application implemented on a user device (e.g., user equipment devices 502, 504, and/or 506 (FIG. 5)) in order to determine a transmission schedule of the identified content. In addition, one or more steps of process 1400 may be incorporated into or combined with one or more steps of any other process or embodiment (e.g., as described in relation to FIGS. 1 and 6-13).

At step 1402, control circuitry 404 identifies content transmitted by the given plurality of content sources that matches the user profile. For example, the content may be a television show, a movie, a sports game, etc., that is featured on the content source. Suppose that control circuitry 404 determines that History Channel is a content source that is not a part of the user's first content source bundle and matches the user profile (e.g., part of the given plurality of content sources). Control circuitry 404 may identify the content "History of US Politics" that is featured on History Channel. It may further determine that the content matches the user's preference because the content is associated with politics and government.

At step 1404, control circuitry 404 may retrieve metadata associated with the identified content from the media guidance data source 518. Metadata may include, but is not limited to, content description, schedule, subtitles, genre information, etc. For example, the metadata of "History of US Politics" may include a description of the episode, the episode number, the actors in the show, and the show's daily schedule.

At step 1406, control circuitry 404 determines a transmission schedule of the identified content. For example, based on the metadata of History of US Politics," control circuitry 404 may determine that the show is transmitted on History Channel between 9:30 pm and 10:00 pm on weekdays.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 14.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for managing user subscriptions to content sources, the method comprising:
    storing a plurality of content source bundles wherein, a first content source bundle includes a first subset of a plurality of content sources and a second content source bundle includes a second subset of the plurality of content sources;
    determining that a user has a subscription to the first content source bundle, wherein the subscription enables the user to access the first subset of content sources in the first content source bundle;
    monitoring viewing habits of the user relative to the first subset of content sources in the first content source bundle;
    identifying, based on the viewing habits, a viewing schedule of the user associated with a first content source of the content sources in the first content source bundle;
    searching, based on a user profile of the user, for a given plurality of content sources that are in the second subset of the plurality of content sources and are not in the first subset of the plurality of content sources and that match the user profile of the user;
    identifying content transmitted by the given plurality of content sources that matches the user profile;
    determining a transmission schedule of the identified content;
    comparing the transmission schedule of the identified content with the viewing schedule of the user;
    selecting a second content source of the given plurality of content sources in response to determining that the transmission schedule of the identified content transmitted by the second content source does not overlap with the viewing schedule of the user associated with the first content source in the first content source bundle; and
    modifying the first content source bundle to add the selected second content source.

2. The method of claim 1 further comprising removing a third content source from the first subset of the first content source bundle based on the modification to the first content source bundle.

3. The method of claim 1, wherein the first content source bundle is associated with a first cost and the second content source bundle is associated with a second cost, further comprising adjusting the first cost based on modifying the first content source bundle.

4. The method of claim 1 further comprising:
    determining that a percentage of the content sources in the first content source bundle viewed by the user is less than a threshold; and
    in response to determining that the percentage is less than the threshold, modifying the first content source bundle.

5. The method of claim 1, wherein monitoring the viewing habits comprises determining from which content sources in the first content source bundle the user access content frequently.

6. The method of claim 1 further comprising:
    characterizing the user based on the viewing habits;
    identifying a second user based on the characterization of the user; and
    enabling the second user to subscribe to the modified first content source bundle in response to identifying the second user based on the characterization.

7. The method of claim 1, wherein the selecting comprises:
    requesting user confirmation to select the second content source, in response to determining that the transmission schedule of the identified content transmitted by the second content source overlaps with the viewing schedule of the user associated with the content sources in the first content source bundle; and
    selecting the second content source in response to user confirmation to select the second content source.

8. The method of claim 1, wherein the viewing schedule specifies a repeated time window in which the user accesses content from the first content source bundle more than a threshold number of days.

9. The method of claim 1, wherein determining the transmission schedule comprises retrieving scheduling information specifying a transmission schedule of each media asset transmitted by the given plurality of content sources.

10. A system for managing user subscriptions to content sources, the system comprising:
    control circuitry configured to:
        store a plurality of content source bundles wherein, a first content source bundle includes a first subset of a plurality of content sources and a second content source bundle includes a second subset of the plurality of content sources;
        determine that a user has a subscription to the first content source bundle, wherein the subscription enables the user to access the first subset of content sources in the first content source bundle;
        monitor viewing habits of the user relative to the first subset of content sources in the first content source bundle;

identify, based on the viewing habits, a viewing schedule of the user associated with a first content source of the content sources in the first content source bundle;

search, based on a user profile of the user, for a given plurality of content sources that are in the second subset of the plurality of content sources and are not in the first subset of the plurality of content sources and that match the user profile of the user;

identifying content transmitted by the given plurality of content sources that matches the user profile;

determine a transmission schedule of the identified content;

compare the transmission schedule of the identified content with the viewing schedule of the user;

select a second content source of the given plurality of content sources in response to determining that the transmission schedule of the identified content transmitted by the second content source does not overlap with the viewing schedule of the user associated with the first content source in the first content source bundle; and modify the first content source bundle to add the selected second content source.

11. The system of claim 10, wherein the control circuitry is further configured to remove a third content source from the first subset of the first content source bundle based on the modification to the first content source bundle.

12. The system of claim 10, wherein the first content source bundle is associated with a first cost and the second content source bundle is associated with a second cost, and wherein the control circuitry is further configured to adjusting the first cost based on modifying the first content source bundle.

13. The system of claim 10, wherein the control circuitry is further configured to:

determine that a percentage of the content sources in the first content source bundle viewed by the user is less than a threshold; and in response to determining that the percentage is less than the threshold, modify the first content source bundle.

14. The system of claim 10, wherein the control circuitry is further configured to monitor the viewing habits by determining from which content sources in the first content source bundle the user access content frequently.

15. The system of claim 10, wherein the control circuitry is further configured to:

characterize the user based on the viewing habits;

identify a second user based on the characterization of the user; and enable the second user to subscribe to the modified first content source bundle in response to identifying the second user based on the characterization.

16. The system of claim 10, wherein the control circuitry is further configured to:

request user confirmation to select the second content source in response to determining that the transmission schedule of the identified content transmitted by the second content source overlaps with the viewing schedule of the user associated with the content sources in the first content source bundle; and select the second content source in response to user confirmation to select the second content source.

17. The system of claim 10, wherein the control circuitry is further configured to determine the transmission schedule by retrieving scheduling information specifying a transmission schedule of each media asset transmitted by the given plurality of content sources.

18. The system of claim 10, wherein the viewing schedule specifies a repeated time window in which the user accesses content from the first content source bundle more than a threshold number of days.

* * * * *